Figure 1:
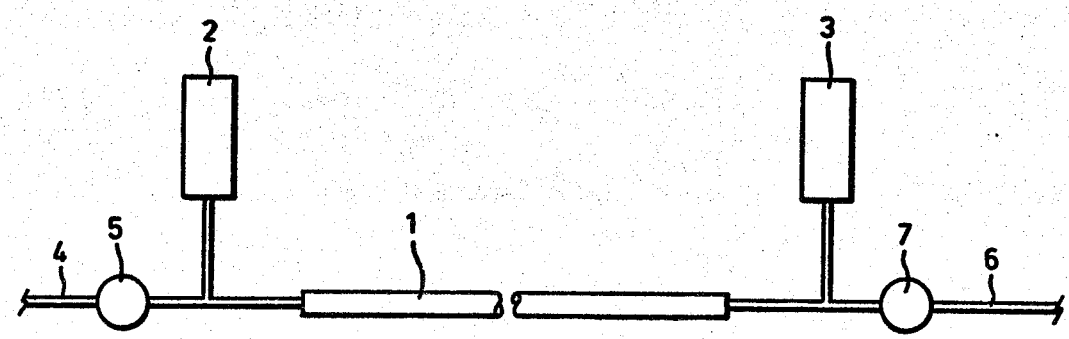

[11] 4,271,007
[45] Jun. 2, 1981

[54] METHOD AND APPARATUS FOR THE PREVENTION OF SOLIDS DEPOSITS IN A TUBULAR REACTOR BY PULSED FLOW

[75] Inventors: Frank Souhrada, Weston; Buenaventura B. Galvez, Islington, both of Canada

[73] Assignee: Gulf Canada Limited, Toronto, Canada

[21] Appl. No.: 97,011

[22] Filed: Nov. 23, 1979

[51] Int. Cl.³ ............... C10G 9/16; C10G 9/18; C10G 47/36
[52] U.S. Cl. .................................. 208/48 R; 137/13; 208/108; 208/113; 366/124; 422/201; 585/953
[58] Field of Search .............. 208/48 R, 48 Q, 107, 208/108, 112; 137/13, 207, 568; 366/124, 108, 825, 826; 585/953

[56] References Cited

U.S. PATENT DOCUMENTS

| 3,243,472 | 3/1966  | Dinwiddie        | 585/630   |
|-----------|---------|------------------|-----------|
| 3,275,546 | 9/1966  | Retallick        | 208/108   |
| 3,519,555 | 7/1970  | Keith et al.     | 208/10    |
| 3,544,074 | 12/1970 | Karpachena       | 366/124 X |
| 3,857,413 | 12/1974 | Zahid            | 137/207   |
| 3,919,074 | 11/1975 | Gatsis           | 208/48 R  |
| 4,013,544 | 3/1977  | Merrill          | 137/13 X  |
| 4,045,092 | 8/1977  | Keller           | 137/13 X  |
| 4,182,358 | 1/1980  | Sinelnikov et al.| 137/568 X |
| 4,190,403 | 2/1980  | Glover           | 137/207 X |

Primary Examiner—Delbert E. Gantz
Assistant Examiner—G. E. Schmitkons
Attorney, Agent, or Firm—D. R. Morrison

[57] ABSTRACT

Deposit of solids on the walls of tubular continuous flow reactors is avoided by a process and apparatus in which an oscillating motion is superimposed on the linear flow of reactants in order to maintain turbulent flow throughout.

12 Claims, 1 Drawing Figure

METHOD AND APPARATUS FOR THE PREVENTION OF SOLIDS DEPOSITS IN A TUBULAR REACTOR BY PULSED FLOW

BACKGROUND OF THE INVENTION

The invention described herein relates to a process and an apparatus for preventing the deposition of solid matter on the walls of tubular reactors.

Tubular reactors are well known and widely used in the chemical process industries. Almost as well known is their tendency to become fouled by deposits of solid material, necessitating frequent removal from service for a cleaning operation. Examples of processes subject to fouling include polymerization reactions, hydrocarbon cracking, and in general, any high temperature reaction involving hydrocarbons in which elemental carbon may be formed.

When reactor walls do become coated with deposits, a great number of difficulties ensue: (i) the heat transfer rate between the tube wall and the material in the centre of the tube diminishes; (ii) temperature regulation deteriorates, lowering control over the reaction and lessening the formation of the desired product and/or increasing the formation of unwanted side products, (iii) overheating often develops in the tubing, leading to shortened reactor life; (iv) frequent shut-downs and cleaning cycles are necessary, and the longer the reactor tubing, the more expensive and difficult the cleaning job; (v) damage to the reactor or ancillary equipment ensues when reactor tubes become plugged and relief valves burst; all of the foregoing difficulties may impair the safety of the entire reactor operation. Furthermore, these problems are aggravated by a need for long residence time and/or high treating temperature, as in the case of cracking operations.

When deposits have formed on the inside of reactor tubing, they may be removed by mechanical means (e.g., high pressure water or steam jets), by solvents (e.g., silane or hot hydrocarbons) or by chemical reaction (e.g., oxidation and/or reduction). However, all of these procedures require removing part or all of the reactor from service for the cleaning cycle.

THE PRIOR ART

Clearly it is preferable to prevent the deposition of solids on tubular reactor walls rather than to remove them after they have formed. Several methods are kown in the art to accompnsh this result, viz. (1) controlling the reaction conditions, e.g., temperature and pressure, (2) adjusting the feed rate of catalyst to avoid too-rapid reaction and consequent overheating, (3) adding inhibiting chemicals, including amines, polyisobutylenes or steamhydrogen mixtures, (4) using liquid curtains or oil films to prevent the solid materials from contacting the walls of the reactor, and (5) recycling of a portion of the product from a reactor to the inlet, to increase the linear flow rate in the reactor and maintain turbulent flow conditions therein.

U.S. Pat. No. 3,919,074 describes the use of recycling in a commercially-sized reactor to reduce fouling when heating a black oil to a temperature between 316° C. and 427° C. A disadvantage of such a recycling process is that the recycle can introduce a concentration of unwanted reaction products, such as coke precursors, to the inlet of the reactor, thereby increasing the potential for fouling. The process is observed to reduce but not entirely prevent fouling even under the temperature conditions of that patent. At much higher temperatures, as in Test Series II hereinafter described, recycling is observed to increase the apparent fouling rate, i.e. decrease the time of operation before the reactor tubing becomes completely blocked. Furthermore, where recycling is utilized in smaller-scale equipment it may become impossible to achieve the desired turbulent flow conditions, because of excessive pressure drop required therefor in smaller diameter tubing.

SUMMARY OF THE INVENTION

The novel feature of the present invention is that an oscillating flow component is superimposed on the reaction mass flowing through a tubular reactor. The superimposed oscillating velocity component is designed to produce a turbulent flow in the reactor. The agitation caused by the turbulent flow checks the deposition of solids on the wall of the reactor, thus impeding reactor blockage and the risk of consequent reactor shutdown.

The invention thus consists in a method for processing a liquid which is to flow through a tubular vessel at a rate that produces primarily laminar flow conditions therein and from which solids can form and deposit onto the wall of the vessel, comprising:

(a) maintaining a contiuous feed of the liquid into the inlet of the vessel at a rate that causes laminar flow of the liquid as it moves to the outlet of the vessel;

(b) applying regularly varying pressure pulses to the flow of the liquid at a location in the flow near one end of the vessel;

(c) maintaining, by means of said pulses, a positive displacement of the liquid to and from a surge chamber adapted to receive and discharge the liquid and connected to the flow near the opposite end of the vessel from the point of application of the varying pressure pulses;

(d) controlling the frequency and amplitude of the pressure pulses effectively so that the flow conditions in the liquid in the vessel between the point of application of the pulses and the surge chamber reach, during the cycles, a peak instantaneous Reynolds number in the turbulent region; and (e) substantially continuously discharging liquid from an outlet downstream from the surge chamber.

The invention further consists in an apparatus for processing liquids having a tendency to deposit solids on tubular reactor walls, comprising:

(a) a tubular reactor in which the processing is carried out;

(b) a pulsating mechanism near one end of said reactor comprising a chamber in open communication with the reactor and a means to induce oscillation in the liquid being processed;

(c) a means near the opposite end of said reactor from said pulsating mechanism to contain the surges of liquid produced by the oscillating flow;

(d) a means to ensure a substantially continuous feed to the reactor system, which reactor system consists of the reactor, the pulsating mechanism and means to contain the surges; and (e) a means at the outlet of the reactor system to maintain pressure inside the reactor system.

Optionally, the means to maintain pressure can comprise means to prevent backflow of reaction products into the outlet of the reactor system from downstream processing steps.

One embodiment of the invention is shown in the FIGURE. A tubular reactor for heat-treating of coke-forming heavy oil petroleum fraction, for example decant oil, consists of a reactor tube 1, a pulsating mechanism 2, a means for containing surges 3, an inlet tube 4, feeding means 5, an outlet tube 6 and pressure-backflow control means 7.

The reactor tube can have an inside diameter as appropriate, given the design capacity of the reactor and allowable pressure drop. It is normally unnecessary to use a diameter below ⅛ inch (3.2 mm) to raise the Reynolds number of the secular flow, because the process of the invention can easily produce turbulent flow even starting from a zero secular flow in such small tubing. At the upper end of the scale, the process is limited only by the energy level that is to be put into the pulsations. In practice, only economic considerations limit the maximum diameter by virtue of the cost of imparting kinetic energy to the reaction mass in superimposing the pulsating flow on the secular flow. The reactor tube can be designed in banks of parallel tubes, in a single length of coiled tube, or in one or more series of coiled tubes. If required, it can be heated by a gas or oil burner, by electric heater, or indirectly by a heated medium, or cooled by appropriate means.

The frequency of the pressure pulses and volume of liquid displaced can be designed to meet the needs of the particular reaction situation. The construction and operating economics usually influence the sizing of the reactor, and are traded off against the imperatives of the chemistry involved, such as the reaction rate and possible chemical equilibria. The resulting secular flow rate may well be in the laminar region, and may require a ten-fold or greater increase in speed to achieve turbulent flow. Under the influence of the pulsating mechanism, the speed changes frequently, causing the Reynolds number to fluctuate through the laminar region and, when properly adjusted for displacement and frequency, into the turbulent region.

Provided that the peak instantaneous Reynolds number is in the turbulent region, the average Reynolds number may be somewhat lower. The critical value needed for turbulent flow is not well defined, depending upon the geometry of the flow channel. For circular tubing, the critical value lies in the range from 2000 to 3000. In the present invention a peak Reynolds number equal to 2700 is deemed sufficient to achieve turbulent flow and check the deposition of solids on the reactor walls; however, a Reynolds number of 3000 gives a safety margin, and therefore the characteristics of the fluctuating flow preferably are any combination of sub-audio frequency and displaced volume that produces a peak Reynolds number of 3000 or greater.

The pulsating mechanism can, for example, consist of a rigid chamber containing a reciprocating piston or diaphragm, which optionally may be driven by positive mechanical driving means. The design volume of the chamber can take into account the frequency of the oscillating piston or diaphragm and the displaced volume of liquid, to ensure that the peak oscillating velocity superimposed on the liquid flow in the reactor tube is in the turbulent flow region. In another arrangement, pressurized substantially inert gas can be employed to impart pulsation to a liquid surface in said rigid chamber. The pressure pulses within the inert gas space of the chamber can be controlled by electrically, pneumatically or mechanically operated valves, installed on lines connecting the chamber to a source of the gas at higher pressure, with appropriate means for relieving the gas pressure in the reverse part of the pulse cycle. In some instances a liquid immiscible with the processed material can be substituted for the above-mentioned gas.

The means for containing surges must be able to accommodate a volume at least equal to the volume of the liquid displaced by each oscillation of the pulsating mechanism. The means for containing surges can include gas, optionally isolated from the reaction mass by a diaphragm.

In another arrangement, the means to contain surges can consist of a piston or diaphragm in a second chamber similar to that of the pulsating mechanism, the piston or diaphragm being provided with a means to maintain pressure on the reaction liquid, for example a spring or a pressurized gas on the opposite side thereof to the reaction liquid. Optionally the two chambers can be mechanically connected and if each reciprocating mechanism be driven by a positive mechanical driving means, then the oscillating mechanism and surge containment means can be driven by the same positive mechanical driving means, but 180 degrees out of phase; that is, when one piston or diaphragm advances, the other recedes.

The feed line to the said reactor can comprise a tube or pipe with a means to maintain a feed rate as desired, for example a pump or where the upstream pressure is sufficient, anti-backflow valve.

The product outlet line can comprise a conventional tube or pipe and a means to maintain pressure and/or prevent backflow of fluid into the reactor system from downstream processing steps. The use of such means is dependent upon the pressure in the reactor system compared to the downstream pressure. For example, such means can be an anti-backflow valve or a pump if the reactor pressure is less than the downstream pressure during part or all of the pulsation cycle, respectively. It can be a pressure regulating valve, for example, if the reactor pressure exceeds the downstream pressure.

The pulsating mechanism can be situated near either inlet or outlet of the reactor, provided that the superimposed oscillation velocity is transmitted throughout the reactor tube to the surge vessel at the other end.

The invention is illustrated in the following series of tests which do not limit the scope of the invention as defined in the ensuing claims.

TEST SERIES I—CONVENTIONAL PROCESS AND SYSTEM

A heavy petroleum fraction consisting of a full-range decant oil was fed to a tubular reactor, 10 feet (3.05 m) long and ⅜ inch (9.5 mm) inside diameter. The reactor tube, in the form of a single coil, was immersed in a fluidized sand bed which was electrically heated. The reactor temperatures were in the range from 493° C. to 504° C. The feed rates were adjusted to obtain a residence time at the above-noted reaction temperature ranging from about 9 to 11 minutes. The durations of three runs before the reactor became plugged with coke are shown in Table I. The calculation of Reynolds number in all Tests Series was of necessity approximate because the density and viscosity of the reaction mass at the noted conditions were estimated rather than measured values. Each run started with a new reactor tube. The longest run lasted for 48 hours; after each run the reactor had to be shut down and cleaned, and its tube which was plugged with coke had to be replaced.

TABLE I
THERMAL TREATMENT OF DECANT OIL IN A CONVENTIONAL TUBULAR REACTOR

| Run. No. | Residence Time | Average Reactor Temp. | Duration | Reynolds No. |
|---|---|---|---|---|
| 1-A | 9.8 mins | 493° C. | 34 hrs. | 220 |
| 1-B | 9.5 mins. | 493° C. | 48 hrs. | 230 |
| 1-C | 11.2 mins. | 504° C. | 26 hrs. | 200 |

TEST SERIES II—CONVENTIONAL PROCESS AND SYSTEM

Another set of tests using a tubular reactor 20 feet (6.1 m) long and ⅜ inch (9.5 mm) inside diameter was carried out. The decant oil of Series I was fed to the reactor at very low rates, and 80% of the product was recycled to the reactor in order to achieve an average residence time in the range from about 4 to 8 minutes. The reactor tube, in the form of a single coil, was immersed in the fluidized sand bed which was electrically heated as in Series I. The reactor temperatures were controlled in the range from 487° C. to 494° C. The results of the tests, shown in Table II, revealed the adverse effect of recycling a portion of the heat-treated product to the reactor. The longest run before complete reactor blockage was 12 hours, compared to 48 hours without recycling in Series I.

TABLE II
THERMAL TREATMENT OF DECANT OIL IN A CONVENTIONAL TUBULAR REACTOR WITH 80% RECYCLE

| Run. No. | Residence Time | Average Reactor Temp. | Duration | Reynolds No. |
|---|---|---|---|---|
| II-A | 7.6 mins. | 487° C. | 12 hrs. | 2900 |
| II-B | 7.6 mins. | 494° C. | 3 hrs. | 2900 |
| II-C | 3.8 mins. | 491° C. | 4 hrs. | 5700 |

SERIES III—EXAMPLE OF THE INVENTION

Test series III illustrates the use of the present invention. The decant oil as used in Series I and II was fed to a pulsed reactor by a gear pump at the rate of about 1700 grams per hour. The reactor tube, in the form of a single coil, was immersed in the fluidized sand bed which was electrically heated as in Series I and II. The tests are summarized in Table III.

Run III-A used a reactor tube 67 feet (20.4 m) in length and ¼ inch (6.4 mm) in inside diameter. The run had a reactor residence time of about 9.9 minutes and an average temperature of 502° C. The pulsating mechanism, which was situated at the inlet of the reactor tube, consisted of a chamber displacing a volume of 4 milliliters per stroke and a diaphragm oscillating at 115 strokes per minute. The surge vessel was partially filled with nitrogen and was located at the outlet of the reactor tube. The run continued for 57 hours with neither blockage nor pressure overrun ever occurring in the reactor. On dismantling the reactor, the inside surface of the tubing was found to be free of deposits.

Run III-B, like Run III-A, proceeded continuously and smoothly for 82 hours until it was normally shut down. Run III-B used a reactor tube 34 feet (10.4 m) in length and ⅜ inch (9.5 mm) in inside diameter. The reactor average temperature was 529° C. The pulsating mechanism consisted of a chamber displacing a volume of 7 milliliters per stroke and a piston oscillating at 58 strokes per minute. The surge vessel had the same characteristics as that in Run III-A. Again, at the end of this experiment, the inside surface of the reactor tubing was virtually free of deposits.

TABLE III
THERMAL TREATMENT OF DECANT OIL IN THE PULSED REACTOR

| Run No. | Residence Time | Average Reactor Temp. | Duration Before Normal Shut-Down* | Peak Reynolds No. |
|---|---|---|---|---|
| III-A | 9.9 mins. | 502° C. | 57 hrs. | 12,400 |
| III-B | 5.2 mins. | 529° C. | 82 hrs. | 13,800 |

*Normal shut-down with no blockage in the reactor.

The runs in Series III have demonstrated that by the use of the oscillating flow reactor, no blockage develops in the reactor during thermal treatment of a decant oil under the specified treatment conditions.

The present invention can be used advantageously in a pilot plant (to simulate the generally turbulent flow in a commercial tubular reactor, regardless of the size limitation of a pilot plant), and in a commercial thermal reactor (operating below its design capacity) without recycling a portion of the product. In the case of heat-treating a decant oil, recycling a portion of the heat-treated product can have an adverse effect; it increases the tendency towards coke formation and coke deposition in the reactor and therefore shortens the reactor run.

Another important application of this invention is in commercial reactors which are susceptible to reactor blockage due to polymerization and solids formation in the laminar boundary layer. The invention can also be used to full advantage in commercial crackers and cokers wherein the cracked products have a tendency to polymerize and solidify in the reactor tube when the flow exhibits a Reynolds number below the turbulent region. Another advantageous application of this invention is in small- to medium-size commercial heaters because it provides for turbulent flow without the need to size the tubes under two inches inside diameter, which tubes are generally difficult to clean.

Persons skilled in the art can see that the oscillating flow reactor is applicable to reactor systems in which reactants undergo any of several types of treatment. The Tests above describe a system in which heat is transferred into the reactor. The principle is also effective in cooling systems, i.e. where heat is being removed from the reactants inside the tube. The use of turbulent flow can be even more important in a cooling system because the viscosity of the reactants increases with decreasing temperature and causes a decrease in the Reynolds number and consequently a tendency towards undesirable laminar flow. In these situations, an increased volume and/or frequency of oscillation may be necessary to maintain the Reynolds number in the region of turbulent flow. The described process and apparatus are also applicable to substantially adiabatic chemical reactions, for example those in which polymers are produced, which polymers have a high viscosity and a tendency to deposit on the walls of the tube.

While the foregoing experiments demonstrate a preferred embodiment of the invention, various modifications and adaptations thereof may be resorted to, without departing from the spirit and scope of the invention, as those skilled in the art can appreciate.

What is claimed is:

1. A method for processing a liquid which is to flow through a tubular vessel at a rate that produces primarily laminar flow conditions therein and from which solids can form and deposit onto the wall of the vessel, comprising:
(a) maintaining a continuous feed of the liquid into the inlet of the vessel at a rate that causes laminar flow of the liquid as it moves to the outlet of the vessel;
(b) applying regularly varying pressure pulses to the flow of the liquid at a location in the flow near one end of the vessel;
(c) maintaining, by means of said pulses, a positive displacement of the liquid to and from a surge chamber adapted to receive and discharge the liquid and connected to the flow near the opposite end of the vessel from the point of application of the varying pressure pulses;
(d) controlling the frequency and amplitude of the pressure pulses effectively so that the flow conditions in the liquid in the vessel between the point of application of the pulses and the surge chamber reach, during the cycles, a peak instantaneous Reynolds number in the turbulent region; and
(e) substantially continuously discharging liquid from an outlet downstream from the surge chamber.

2. A method as defined in claim 1 wherein the flow reaches a peak instantaneous Reynolds number above 3000.

3. An apparatus for processing liquids having a tendency to deposit solids on tubular reactor walls, comprising:
(a) a tubular reactor in which the processing is carried out;
(b) a pulsating mechanism near one end of said reactor comprising a chamber in open communication with the reactor and a means to induce continuous sub-audio oscillation in the liquid being processed of frequency and amplitude sufficient to achieve during each oscillation a peak instantaneous Reynolds number in the turbulent flow region;
(c) a means near the opposite end of said reactor from said pulsating mechanism to contain the surges of liquid produced by the oscillating flow;
(d) a means to ensure a substantially continuous feed to the reactor system, which reactor system consists of the reactor, the pulsating mechanism and means to contain the surges; and
(e) a means at the outlet of the reactor system to maintain pressure inside the reactor system.

4. An apparatus as defined in claim 3 wherein the reactor tube ranges up from ⅛ inch (3.2 mm) in inside diameter.

5. An apparatus as defined in claim 3 wherein the pulsating mechanism comprises a chamber and a piston or a chamber and a diaphragm, equipped with means to induce a reciprocating motion.

6. An apparatus as defined in claim 5 in which the means to accommodate surges comprises a chamber and a piston or a chamber and a diaphragm, equipped with means to maintain pressure on the liquid being processed.

7. An apparatus as defined in claim 6 in which the means to accommodate surges is mechanically attached to the pulsating mechanism.

8. An apparatus as defined in claim 7 in which the means to accommodate surges is mechanically attached to the pulsating mechanism and both pistons or diaphragms are coupled to the same means to induce reciprocating motion.

9. An apparatus as defined in claim 3 in which the means to accommodate surges is a vessel partially filled with an inert gas.

10. An apparatus as defined in claim 3 in which the means to control the liquid flow at the outlet of the system is of the group consisting of anti-backflow valve, pump, and pressure regulating valve.

11. In a method for processing a liquid which is to flow through a tubular vessel at a rate that produces primarily laminar flow conditions therein and from which solids can form and deposit onto the wall of the vessel, comprising:
(a) maintaining a continuous feed of the liquid into the inlet of the vessel at a rate that causes laminar flow of the liquid as it moves to the outlet of the vessel, and
(b) substantially continuously discharging liquid from an outlet at the end of the vessel remote from the inlet, the improvement which comprises:
(1) applying regularly varying pressure pulses to the flow of the liquid at a location in the flow near one end of the vessel;
(2) maintaining, by means of said pulses, a positive displacement of the liquid to and from a surge chamber adapted to receive and discharge the liquid and connected to the flow near the opposite end of the vessel from the point of application of the varying pressure pulses; and
(3) controlling the frequency and amplitude of the pressure pulses effectively so that the flow conditions in the liquid in the vessel between the point of application of the pulses and the surge chamber reach, during the cycles, a peak instantaneous Reynolds number in the turbulent region.

12. In an apparatus for processing liquids having a tendency to deposit solids on tubular reactor walls, comprising:
(a) a tubular reactor in which the processing is carried out,
(b) a means to ensure a substantially continuous feed to the reactor inlet at one end thereof, and
(c) a means at the outlet of the reactor and remote from the inlet to maintain pressure inside the reactor, the improvement which comprises:
(1) a pulsating mechanism near one end of said reactor including a chamber in open communication with the reactor and a means to induce, in the flow of liquid in the reactor, continuous sub-audio oscillation of frequency and amplitude sufficient to achieve during each oscillation a peak instantaneous Reynolds number in the turbulent flow region, and
(2) a means near the opposite end of said reactor from said pulsating mechanism to contain the surges of liquid produced by the oscillating flow.

* * * * *